United States Patent
Kawai et al.

(10) Patent No.: US 7,275,871 B2
(45) Date of Patent: Oct. 2, 2007

(54) FLUID DYNAMIC BEARING STRUCTURE AND METHOD OF ADJUSTING BEARING GAP

(75) Inventors: Tomohiko Kawai, Yamanashi (JP); Kenzo Ebihara, Yamanashi (JP); Fuminobu Nakamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 213 days.

(21) Appl. No.: 11/224,225

(22) Filed: Sep. 13, 2005

(65) Prior Publication Data

US 2006/0056747 A1    Mar. 16, 2006

(30) Foreign Application Priority Data

Sep. 16, 2004  (JP) .............................. 2004-269255

(51) Int. Cl.
*F16C 29/12*    (2006.01)
(52) U.S. Cl. .......................................... 384/12; 384/40
(58) Field of Classification Search .................. 384/12, 384/13, 26, 40, 41
See application file for complete search history.

(56) References Cited

U.S. PATENT DOCUMENTS 4,512,616 A * 4/1985 Suzuki et al. .................. 384/42
4,630,942 A * 12/1986 Tsumaki et al. .............. 384/12
4,913,021 A * 4/1990 Moran .......................... 83/641
6,428,210 B1 * 8/2002 Kafai .......................... 384/12

FOREIGN PATENT DOCUMENTS

JP    1-194847    8/1989

* cited by examiner

*Primary Examiner*—Thomas R. Hannon
(74) *Attorney, Agent, or Firm*—Staas & Halsey LLP

(57) ABSTRACT

A bolt insertion hole is provided along an edge end portion on a flat surface of a plate-like member, and a tap hole is provided on an end face of the other edge end correspondingly to the bolt insertion hole. A bolt is inserted into the bolt insertion hole and screwed with the tap hole, and a box bearing is formed by means of four plate-like members joined together. The diameter of the bolt insertion hole is made larger than the diameter of the bolt. By changing the insertion position of the bolt with respect to the bolt insertion hole, the distance of a bearing gap inside the bearing, which is formed into the shape of a box, can be adjusted.

3 Claims, 3 Drawing Sheets

FLUID DYNAMIC BEARING STRUCTURE AND METHOD OF ADJUSTING BEARING GAP

BACKGROUND OF THE INVENTION

1. Field of the Invention

The present invention relates to a fluid dynamic bearing. Particularly, the present invention relates to a fluid dynamic bearing which is suitable for a bearing used in an apparatus which requires nanometer order positioning accuracy such as an ultraprecision machine.

2. Description of the Related Art

In apparatuses which require nanometer order positioning accuracy such as an ultraprecision machine, a non-contact bearing such as an air bearing is used in order to eliminate the influence of friction occurred when a movable member is moved. In a fluid dynamic bearing such as an air bearing, a bearing gap therein is related to bearing rigidity, and when the bearing gap becomes small, the bearing rigidity becomes high. The gap of the bearing needs to be a few micrometers to cause high bearing rigidity and maintain a non-contact state of the bearing.

As a method of forming such a bearing gap in micrometer order, conventionally there was only a method of processing the individual parts configuring a bearing in dimensional accuracy of micrometer order or less, and assembling the bearing to obtain a few micrometer bearing gap.

It should be noted that, in a linear transfer machine in which an air bearing is used, in order to prevent the accuracy of motion from being reduced due to a change in the bearing gap which is caused by the heat generated from a coil of the linear motor, there is known a technology in which a cooling tube is inserted into the core around which the coil is wound in the linear motor to cool the linear motor so that the change in the bearing gap which is caused by the heat can be prevented (see Japanese Patent Application Laid-Open No. 1-194847).

In order to form a few micrometer bearing gap, in a conventional manufacturing method for a fluid dynamic bearing, the parts configuring the bearing need to be processed so that the few micrometer bearing gap can be obtained. In this case, since the dimensional accuracy of these parts is the micrometer order, the machining process for the parts becomes extremely difficult. Therefore, the dimension of the part has to be measured and processed repeatedly in order to obtain a bearing gap having a target size, and processing the parts by means of only the machining process requires considerable amount of time. Moreover, after processing the parts configuring the bearing, the bearing gap cannot be adjusted. If adjustment of the bearing gap is possible, a burden on the machining process of the parts configuring the bearing gap can be reduced. Such a fluid dynamic bearing in which the bearing gap can be adjusted does not exist in the prior art.

In the invention described in the abovementioned Japanese Patent Application Laid-Open No. 1-194847 as well is also designed to prevent a change in the bearing gap of the air bearing, and cannot adjust the bearing gap.

SUMMARY OF THE INVENTION

The fluid dynamic bearing structure of the present invention comprises a plate-like member having a square flat surface and an end face perpendicular to the square flat surface. The flat surface of the plate-like member is provided with a plurality of discharge ports for fluid, and also provided with two or more bolt insertion holes at the vicinity of one edge of the flat surface along the edge. The end face on the other edge opposite said one edge of the plate-like member is provided with tap holes at the positions corresponding to the bolt insertion holes. A bolt with a diameter which is smaller than the diameter of the bolt insertion hole is inserted into the bolt insertion hole of one plate-like member and screwed into the tap hole of another plate-like member, so that four of the plate-like members are coupled together by means of the bolts to form a box. And, the inner surface of the box is formed as a bearing surface for a fluid dynamic bearing so that a bearing gap can be adjusted by adjusting the insertion position of the bolt with respect to the bolt insertion hole.

The bolt insertion hole may be formed in an oblong shape, and the bearing gap is adjusted by changing the shape and size of the square which is formed with the inner surfaces of the box configured with the four plate-like members, within a range of the gap between the bolt insertion hole and the bolt.

Further, in a method for adjusting a bearing gap in the fluid dynamic bearing structure according to the present invention, the insertion position of the bolt for the bolt insertion hole is adjusted and fixed, thereby adjusting the bearing gap between the member in which the bolt is inserted and the other member, which is a bearing guide.

According to the present invention, by adjusting the positional relationship between the bolts for connecting and fixing the plate-like members configuring the fluid dynamic bearing and the bolt insertion holes for the bolts, the bearing gap for a bearing can be adjusted, thus after assembling a bearing the bearing gap can be adjusted. Accordingly, the processing of the members configuring the fluid dynamic bearing becomes easy, whereby the processing time can be reduced.

BRIEF DESCRIPTION OF THE DRAWINGS

The above-described and other objects and characteristics of the present invention are made apparent in the description of the embodiments below with reference to the attached diagrams. Of these diagrams.

DETAILED DESCRIPTION OF THE PREFERRED EMBODIMENTS

Figure 1:
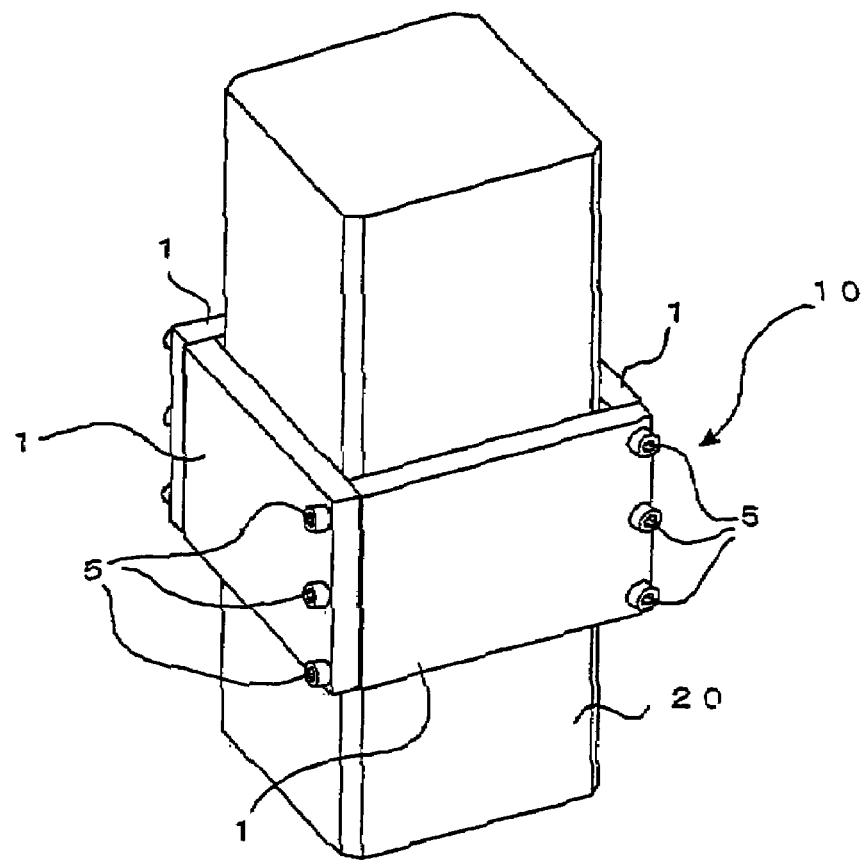
FIG. 1 is a perspective view of an embodiment of the fluid dynamic bearing structure according to the present invention.
Figure 2:
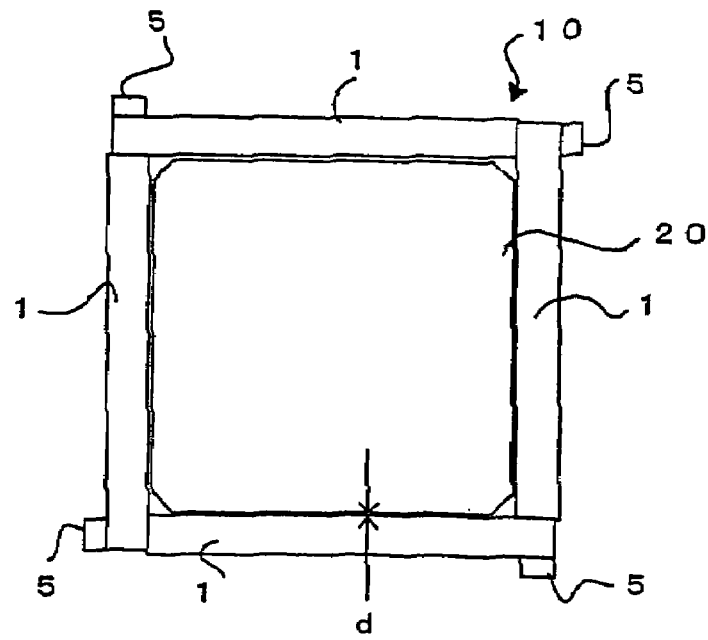
FIG. 2 is a plan view in which a bearing in the fluid dynamic bearing structure of FIG. 1 is viewed from above.

FIG. 1 is a perspective view of the fluid dynamic bearing, and FIG. 2 is a plan view in which the fluid dynamic bearing of FIG. 1 is viewed from above. The reference numeral 20 is a bearing guide which is fixed to a machine or the like for guiding a fluid dynamic bearing. A box bearing 10 is formed so as to surround the bearing guide 20. As shown in FIG. 2, a bearing gap d is formed between the bearing guide 20 and the bearing 10. Although abbreviated in FIG. 1 and FIG. 2, the fluid dynamic bearing is formed by injecting compressed fluid such as air into the bearing gap d.

Figure 3:
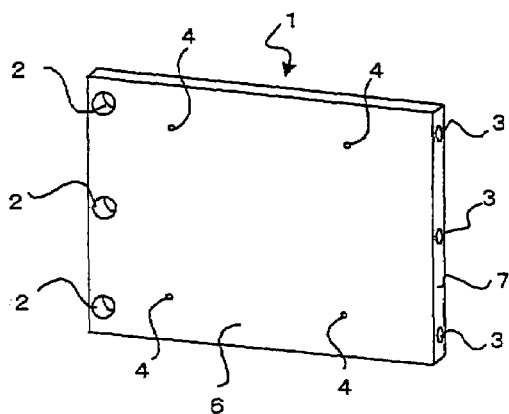
FIG. 3 is a perspective view of a plate-like member which configures the bearing of FIG. 2.

FIG. 3 is a perspective view of a plate-like member 1 which has a flat surface and an end face perpendicular to the flat surface, the flat surface and end face configuring the box bearing.

In a flat surface 6 of the plate-like member 1, there are formed on one edge end portion of the flat surface a plurality of (three in this embodiment) bolt insertion holes 2 along the edge end portion. Moreover, on an end face 7 on an edge opposite the end portion on which the bolt insertion holes 2 are formed, a plurality (three in this embodiment) of tap holes 3 are formed so as to correspond to the bolt insertion holes 2.

Furthermore, the flat surface 6 of the plate-like member 1 is provided with a plurality of fluid discharge ports 4 (four of them are shown in FIG. 3).

Figure 4:
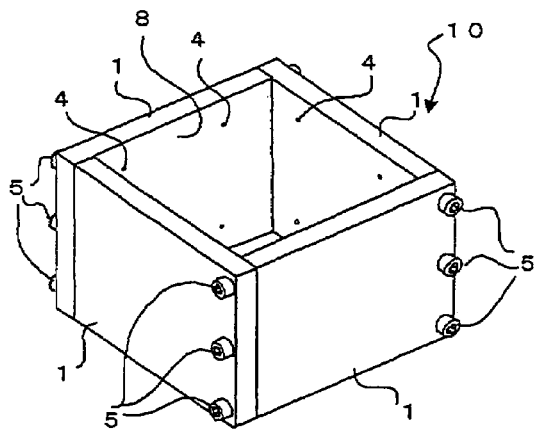
FIG. 4 is a perspective view showing a state when four of the plate-like member shown in FIG. 3 are connected and fixed to each other with bolts to form a box bearing.

The box bearing 10 is formed by joining four of the plate-like member 1. The flat surface 6 of one plate-like member 1 is brought to abut against the end face 7 of another plate-like member 1, positions of the bolt insertion holes 2 and the tap holes 3 provided on the end face 7 are set, and bolts 5 are inserted into these bolt insertion holes 2 and screwed together with the tap holes to join two of the plate-like members 1. In a similar manner, four plate-like members 1 are joined to form the box bearing 10. FIG. 4 is a perspective view of the bearing 10 formed in the above-described manner, in which the inner surface of the box forms a fluid dynamic bearing surface 8. The bearing guide 20 is inserted into the box bearing 10 as shown in FIG. 1.

In the present invention, the diameter of the abovementioned bolt insertion hole 2 is formed to be larger than the diameter of the bolt.

Figure 5A:
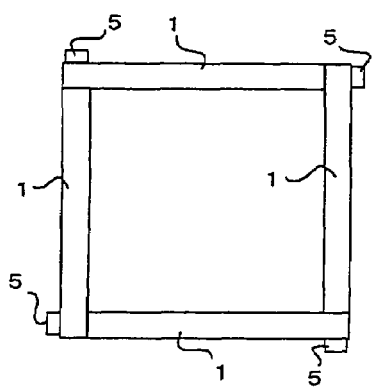
FIGS. 5A through 5C are plan views of the box bearing, in which the positional relationship of the bolt with respect to a bolt insertion hole is changed to adjust a bearing gap between a bearing guide and a bearing, in the fluid dynamic bearing structure of FIG. 1, the box bearing being viewed from above.
Figure 5B:
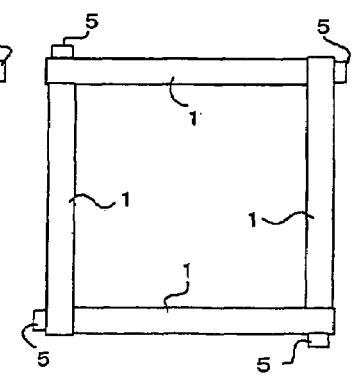
Figure 5C:
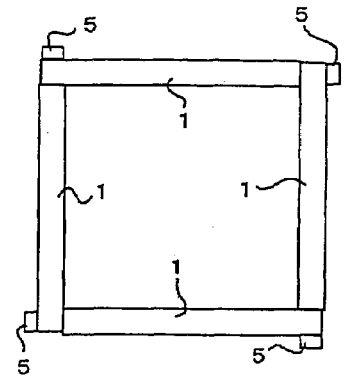
Figure 6A:
FIGS. 6A through 6C are figures for explaining the positional relationship of the bolt with respect to the bolt insertion hole when adjusting the bearing gap between the bearing guide and the bearing, in the fluid dynamic bearing structure of FIG. 1.
Figure 6B:
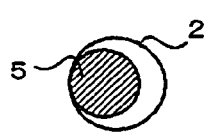
Figure 6C:
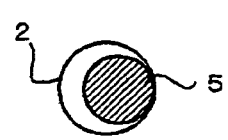
Figure 7A:
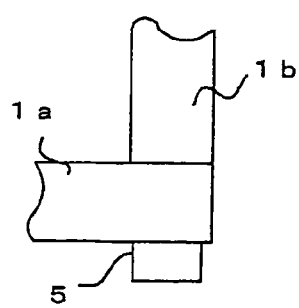
FIGS. 7A through 7C are enlarged views of a bolt coupling portion, in which the positional relationship of the bolt with respect to the bolt insertion hole is changed, in the fluid dynamic bearing structure of FIG. 1.
Figure 7B:
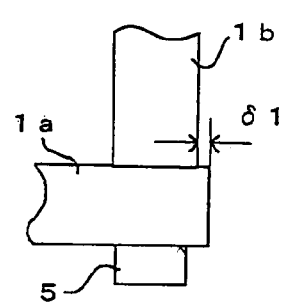
Figure 7C:
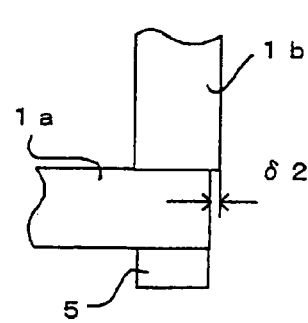

FIG. 6A through FIG. 6C are figures showing the positional relationship between the bolt insertion hole 2 and the bolts 5 inserted into the bolt insertion hole 2 and screwed together with the tap hole 3. Moreover, FIG. 5A through FIG. 5C are plan views of the bearing 10 shown in FIG. 4, which is viewed from above, and FIG. 7A through FIG. 7C are enlarged views of a coupling portion of the bearing 10 where the bolts 5 are used for coupling. In FIG. 7A through FIG. 7C, one plate-like member is indicated by 1a, and the other plate-like member is indicated 1b, for convenience of explanation.

FIG. 6A shows a state in which the plate-like member 1 is positioned so that the central axis of the bolt 5 fits the bolt insertion hole 2, and fixed with the bolt 5, and FIG. 5A shows a state in which four plate-like members 1 are coupled in a manner as shown in FIG. 6A. Also, an enlarged view of the coupling portion in FIG. 5A is shown in FIG. 7A.

FIG. 5B is a figure showing a state in which each of the plate-like members 1 is fixed according to the relationship between the bolt insertion hole 2 and the bolt 5 shown in FIG. 6B. As shown in FIG. 6B, the plate-member 1 is fixed in the state where the bolt 5 is shifted in the bolt insertion hole 2 toward the inward side of the flat surface 6 of the plate-like member 1 in the longitudinal direction (the direction of an edge perpendicular to an edge which is coupled by means of the bolt). FIG. 7B is an enlarged view of the coupling portion obtained by the bolts 5 in FIG. 5B.

Comparing FIG. 5A, which shows the shape of the bearing 10 when the bolt insertion hole 2 is, as shown in FIG. 6A, fitted to the central axis of the bolt 5 to fix the plate-like member, with FIG. 5B, which shows a state when the bolt 5 is, as shown in FIG. 6B, fixed into the bolt insertion hole 2 at a position shifted toward the inward side of the plate-like member 1 in the longitudinal direction, it is apparent that, in the case of FIG. 5B, the end face 7 of a plate-like member 1 is protruded to the outside from the flat surface 6 of the other plate-like member 1, as compared with the case of FIG. 5A. In this regard, as shown in the enlarged view in FIG. 7B, the end face 7 of the plate-like member 1a in the coupling portion formed with the bolts is protruded outside from the flat surface 6 of the plate-like member 1b by δ1. As a result, the region surrounded by the inner surfaces that form the fluid dynamic bearing surfaces 8 of the box bearing is smaller in FIG. 5B than in FIG. 5A.

Furthermore, in FIG. 6C, the bolt 5 is shifted in the bolt insertion hole 2 toward the outer side in the flat surface 6 of the plate-like member in the longitudinal direction to fix and connect the plate like members 1. This state is shown in FIG. 5C and FIG. 7C. As shown in the enlarged view of FIG. 7C, the end face 7 of the plate member 1a is positioned inside more from the flat surface 6 of the plate-like member 1b by δ2, whereby the region surrounded by the inner surfaces that form the fluid dynamic bearing surfaces 8 of the box bearing 10 is larger in FIG. 5C than in FIG. 5A.

In this manner, when the diameter of the bolt insertion hole 2 is made larger than the diameter of the bolt 5, and the plate-like members 1 are coupled and joined with the bolts 5 to form the box bearing 10, the positional relationship between the bolt 5 inserted into the bolt insertion hole 2 and the bolt insertion hole 2 is adjusted, the size of the region surrounded by the inner surfaces forming the bearing surfaces of the box bearing 10 can be changed to adjust the size of the bearing gap.

In the examples shown in FIG. 1 and FIG. 2, the box bearing 10 is formed in the state shown in FIG. 5C, FIG. 6C and FIG. 7C. As shown in FIG. 2, the gap d between the bearing guide 20 and the bearing surface of the bearing 10 can be adjusted by the position of the bolt 5 which is inserted into the bolt insertion hole 2.

In the above-described embodiment, the bolt insertion hole 2 has a diameter which is larger than that of the bolt 5, but also this hole may be formed in an oblong shape. Specifically, the bolt insertion hole may have a oblong shape whose length in the direction of an edge where the plate-like member is coupled by means of the bolt is equal to the diameter of the bolt 5, while whose length in the longitudinal direction (direction of the edge perpendicular to an edge which is coupled by means of the bolt) of the flat surface 6 of the plate-like member 1 is longer than the diameter of the bolt 5. By adjusting the position in which the bolt is inserted into this oblong bolt insertion hole, the bearing gap can be adjusted.

What is claimed is:

1. A fluid dynamic bearing structure, comprising a plate-like member having a square flat surface and an end face perpendicular to the square flat surface, wherein the flat surface of the plate-like member is provided with a plurality of discharge ports for fluid, and also provided with two or more bolt insertion holes at the vicinity of one edge of the flat surface along the edge;

the end face on the other edge opposite said one edge of the plate-like member is provided with tap holes at the positions corresponding to the bolt insertion holes;

a bolt with a diameter which is smaller than the diameter of the bolt insertion hole is inserted into the bolt insertion hole of one plate-like member and screwed into the tap hole of another plate-like member, so that four of the plate-like members are coupled together by means of the bolts to form a box; and the inner surface of the box is formed as a bearing surface for a fluid dynamic bearing so that a bearing gap can be adjusted by adjusting the insertion position of the bolt with respect to the bolt insertion hole.

2. The fluid dynamic bearing structure according to claim 1, wherein the bolt insertion hole is formed in an oblong shape, and the bearing gap is adjusted by changing the shape and size of the square which is formed with the inner surfaces of the box configured with the four plate-like members, within a range of the gap between the bolt insertion hole and the bolt.

3. A method for adjusting a bearing gap in the fluid dynamic bearing structure according to claim 1 or claim 2, wherein the insertion position of the bolt for the bolt insertion hole is adjusted and fixed, thereby adjusting the bearing gap between the member in which the bolt is inserted and the other member, which is a bearing guide.

* * * * *